US012275037B2

(12) United States Patent
Fareed

(10) Patent No.: US 12,275,037 B2
(45) Date of Patent: *Apr. 15, 2025

(54) SUBSTRATE HAVING A BURNABLE COATING MASK

(71) Applicant: Vitro Flat Glass LLC, Cheswick, PA (US)

(72) Inventor: Farzad Fareed, San Diego, CA (US)

(73) Assignee: Vitro Flat Glass LLC, Cheswick, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/171,095

(22) Filed: Feb. 17, 2023

(65) Prior Publication Data

US 2023/0201869 A1 Jun. 29, 2023

Related U.S. Application Data

(63) Continuation of application No. 16/913,305, filed on Jun. 26, 2020, now Pat. No. 11,602,767.

(60) Provisional application No. 62/868,324, filed on Jun. 28, 2019, provisional application No. 63/018,596, filed on May 1, 2020.

(51) Int. Cl.
*B32B 3/10* (2006.01)
*B05D 1/32* (2006.01)
*B32B 3/18* (2006.01)
*B32B 3/22* (2006.01)
*C03C 17/00* (2006.01)
*C09D 5/00* (2006.01)
*C09D 163/10* (2006.01)
*C09D 175/02* (2006.01)
*B05D 3/08* (2006.01)

(52) U.S. Cl.
CPC ............ B05D 1/322 (2013.01); C03C 17/001 (2013.01); C09D 5/002 (2013.01); C09D 163/10 (2013.01); C09D 175/02 (2013.01); *C03C 2218/34* (2013.01)

(58) Field of Classification Search
CPC .... B05D 1/32; B05D 3/08; B32B 3/10; B32B 17/10; B32B 17/10005; B32B 17/10018; B32B 17/10036; B32B 17/10128; B32B 17/10183; B32B 17/10192; B32B 17/10247; B32B 17/10266
USPC ..... 427/259, 272; 428/195.1, 200, 201, 202, 428/426
See application file for complete search history.

(56) References Cited

U.S. PATENT DOCUMENTS

| | | |
|---|---|---|
| 2,807,111 A | 9/1957 | Turner |
| 3,721,594 A * | 3/1973 | Tarnopol ............ C03C 17/3673 156/89.18 |
| 3,762,988 A | 10/1973 | Clock et al. |
| 4,287,107 A | 9/1981 | Hermann et al. |
| 4,466,562 A | 8/1984 | DeTorre |
| 4,504,109 A | 3/1985 | Taga et al. |
| 4,671,155 A | 6/1987 | Goldinger |
| 4,746,347 A | 5/1988 | Sensi |
| 4,792,536 A | 12/1988 | Pecoraro et al. |
| 4,923,757 A | 5/1990 | O'Dwyer et al. |
| 4,952,423 A | 8/1990 | Hirata et al. |
| 5,028,759 A | 7/1991 | Finley |
| 5,030,593 A | 7/1991 | Heithoff |
| 5,030,594 A | 7/1991 | Heithoff |
| 5,059,295 A | 10/1991 | Finley |
| 5,240,886 A | 8/1993 | Gulotta et al. |
| 5,385,872 A | 1/1995 | Gulotta et al. |
| 5,393,593 A | 2/1995 | Gulotta et al. |
| 5,403,616 A | 4/1995 | Hattori et al. |
| 5,653,903 A | 8/1997 | Pinchok, Jr. et al. |
| 5,796,055 A | 8/1998 | Benson, Jr. et al. |
| 5,945,462 A | 8/1999 | Salamon |
| 6,682,773 B2 | 1/2004 | Medwick et al. |
| 7,335,421 B2 | 2/2008 | Thiel et al. |
| 7,361,404 B2 | 4/2008 | Finley et al. |
| 7,749,621 B2 | 7/2010 | Greenberg et al. |
| 8,865,325 B2 | 10/2014 | Polcyn et al. |
| 9,932,267 B2 | 4/2018 | Polcyn et al. |
| 10,479,724 B2 | 11/2019 | Ganjoo et al. |
| 11,426,984 B2 | 8/2022 | Fareed et al. |
| 11,440,297 B2 | 9/2022 | Fareed et al. |
| 11,602,767 B2 * | 3/2023 | Fareed ................. C03C 17/001 |
| 2002/0176988 A1 | 11/2002 | Medwick et al. |
| 2003/0228470 A1 | 12/2003 | Allaire et al. |
| 2003/0232197 A1 | 12/2003 | Disteldorf |

(Continued)

FOREIGN PATENT DOCUMENTS

| | | |
|---|---|---|
| CN | 1353156 A | 6/2002 |
| CN | 102046553 A | 5/2011 |

(Continued)

OTHER PUBLICATIONS

Machine translation of JP 05-081942 A (no date).*

(Continued)

*Primary Examiner* — Michael J Feely

(74) *Attorney, Agent, or Firm* — The Webb Law Firm

(57) ABSTRACT

A substrate having a burnable coating mask includes: a substrate having a first section and a second section; a mask coating layer over the first section of the substrate; and a functional coating layer over at least a portion of the mask coating layer and over the second section of the substrate. A method of segmenting a substrate having a layer thereover, a method of preparing a segmented substrate having a layer thereover, a segmented substrate, and a transparency are also disclosed.

14 Claims, 6 Drawing Sheets

(56) References Cited

U.S. PATENT DOCUMENTS

| | | |
|---|---|---|
| 2005/0153064 A1 | 7/2005 | Lipson |
| 2005/0181219 A1 | 8/2005 | Depauw et al. |
| 2006/0246302 A1 | 11/2006 | Brady et al. |
| 2007/0208157 A1 | 9/2007 | Posey et al. |
| 2007/0231553 A1 | 10/2007 | Hartig et al. |
| 2009/0044897 A1 | 2/2009 | Thomsen et al. |
| 2011/0177324 A1 | 7/2011 | Zagdoun et al. |
| 2013/0019637 A1 | 1/2013 | Sol et al. |
| 2013/0032281 A1 | 2/2013 | Van Den Berg et al. |
| 2013/0299097 A1 | 11/2013 | Sjong |
| 2014/0272453 A1 | 9/2014 | Polcyn et al. |
| 2015/0072083 A1 | 3/2015 | Nebioglu et al. |
| 2015/0240112 A1 | 8/2015 | Hulteen et al. |
| 2016/0075903 A1 | 3/2016 | Miller-Jupp et al. |
| 2016/0194516 A1 | 7/2016 | Nadaud et al. |
| 2017/0341977 A1 | 11/2017 | Polcyn et al. |
| 2018/0118614 A1 | 5/2018 | Polcyn et al. |
| 2019/0204480 A1 | 7/2019 | Thiel et al. |
| 2019/0276354 A1 | 9/2019 | Ducourthial et al. |
| 2021/0087104 A1 | 3/2021 | Heurtefeu et al. |
| 2021/0340058 A1 | 11/2021 | Fareed |

FOREIGN PATENT DOCUMENTS

| | | | |
|---|---|---|---|
| CN | 102883823 A | | 1/2013 |
| CN | 103702828 A | | 4/2014 |
| CN | 104419318 A | | 3/2015 |
| CN | 109790068 A | | 5/2019 |
| DE | 102015115030 A1 | | 3/2017 |
| EP | 1239329 A2 | | 9/2002 |
| EP | 2735592 A1 | | 5/2014 |
| EP | 3064479 A1 | | 9/2016 |
| GB | 823754 A | * 1/1960 | ............. C03C 17/36 |
| GB | 2302102 A | | 1/1997 |
| JP | H0581942 A | | 4/1993 |
| JP | 20023750 A | | 1/2002 |
| RU | 2402585 C1 | | 10/2010 |
| RU | 2615410 C2 | | 4/2017 |
| WO | 03068502 A1 | | 8/2003 |
| WO | 2007052587 A1 | | 5/2007 |
| WO | 2007092412 A2 | | 8/2007 |
| WO | 2013184904 A1 | | 12/2013 |
| WO | 2017144823 A1 | | 8/2017 |
| WO | 2017144824 A1 | | 8/2017 |
| WO | 2019122611 A1 | | 6/2019 |
| WO | 2020161733 A1 | | 8/2020 |
| WO | 2020234040 A1 | | 11/2020 |
| WO | 2020264345 A1 | | 12/2020 |

OTHER PUBLICATIONS

Machine translation of JP 2002-003750 A (no date).*
"Acqua TM 240", Michelman, 2017, two pages.
"AQUACER 526", BYK Additives & Instruments, 2012, two pages.
"AQUACER 1031", BYK Additives & Instruments, 2012, two pages.
"AQUACER 541", BYK Additives & Instruments, 2014, two pages.
"AQUACER 8500", BYK Additives & Instruments, 2015, two pages.
Beech et al., "Thermodynamic Melting Point of Poly(Ethylene Oxide)", Polymer Letters, 1970, pp. 731-734, vol. 8.
"Low-E Glass Products—Blending natural views with energy efficiency.", Vitro Architectural Glass, 2019, pp. 1-6.
"Michem R Emulsion 48040M2", Michelman, 2017, two pages.
"Michem R Emulsion 62330", Michelman, 2017, two pages.
"Michem R Lube 160 PFP", Michelman, 2017, two pages.
"Michem R Guard 1350", Michelman, 2017, two pages.
"RHEOBYK-425", BYK Additives & Instruments, 2018, four pages.
"RHEOBYK-T 1000 VF", BYK Additives & Instruments, 2018, four pages.
"RHEOBYK-L 1400 VF", BYK Additives & Instruments, 2018, two pages.
"RHEOBYK-H 3300 VF", BYK Additives & Instruments, 2018, two pages.
"Safety Data Sheet: Indrapol (Polyethylene Wax)", Industrial Raw Materials LLC, 2015, pp. 1-6.
"SPV CGP-series—Surface Protection Tapes", Nitto, 2019, two pages.
"Sungate 400 Glass—A passive low-e coating to help reduce heating expense.", Vitro Architectural Glass, 2019, pp. 1-6.
Abrbuzzsa, "How a windowscreen is manufactured—National Auto Glass," Jun. 1, 2012, XP093235331, Retrieved from the internet: URL:https://www.youtube.com/watch?v+HH3fAyJrYo.

* cited by examiner

SUBSTRATE HAVING A BURNABLE COATING MASK

CROSS REFERENCE TO RELATED APPLICATIONS

This application claims priority to and is a continuation of U.S. patent application Ser. No. 16/913,305, filed on Jun. 26, 2020, which claims priority to U.S. Provisional Patent Application No. 62/868,324, filed on Jun. 28, 2019 and to U.S. Provisional Patent Application No. 63/018,596, filed on May 1, 2020, each of which is incorporated herein by reference in its entirety.

BACKGROUND OF THE INVENTION

Field of the Invention

The present invention is directed to a substrate having a burnable coating mask, a method of segmenting a substrate having a layer thereover, a method of preparing a segmented substrate having a layer thereover, a segmented substrate, and a transparency.

Description of Related Art

For certain applications, a substrate may be desired that has a functional coating over certain sections of the substrate and no functional coating over other sections of the substrate. As one example, some automakers utilize infrared cameras or rain detectors whose sensors are interfered with by the presence of the functional coating over certain sections of the substrate through which the sensor transmits infrared (or other) radiation.

One procedure to manufacture such a substrate is to use laser deletion to remove the functional coating from the relevant sections of the substrate. However, some customers have rejected substrates manufactured using laser deletion because laser deletion technology incompletely removes the functional coating in certain cases.

Therefore, it is desired to produce a substrate with a functional coating over certain sections of the substrate and no functional coating over other sections of the substrate without the use of laser deletion.

SUMMARY OF THE INVENTION

The present invention is directed to a substrate having a burnable coating mask, including: a substrate having first surface and a second surface opposite the first surface. The first surface has a first section and a second section adjacent the first section. A mask coating layer is positioned over the first section of the first surface. The mask coating layer is not positioned over the second section of the first surface. A functional coating layer is positioned over at least a portion of the mask coating layer and over the second section of the substrate. When the coated substrate is heated, the burnable coating mask, and a portion of the functional coating layer over the burnable coating mask is removed leaving an area on the substrate that does not have a functional coating layer.

The present invention is also directed to a method of segmenting a substrate. A substrate having a burnable coating mask is provided. The substrate includes a first surface and a second surface opposite the first surface. The first surface has a first section and a second section adjacent the first section. A mask coating layer is positioned over the first section. The mask coating layer is not positioned over the second section of the first surface. A functional coating layer is positioned over at least a portion of the mask coating layer and over the second section of the substrate. The coated substrate is heated so that the mask coating layer is removed from the first section. A portion of the functional coating positioned over the mask coating layer is also removed from the first section. The portion of the functional coating positioned over the second section remains substantially intake on the substrate.

The present invention is also directed to a method of preparing a segmented substrate. A substrate having first surface and a second surface opposite the first surface is provided. The first surface has a first section and a second section adjacent the first section. A material is applied over the first section of the first surface to form a mask coating layer. The mask coating layer is not positioned over the second section of the first surface. A functional coating layer is applied over at least a portion of the mask coating layer and over the second section of the first surface to form a functional coating layer.

The present invention is also directed to a method of preparing an automotive transparency, including: providing a first ply having a No. 1 surface and an No. 2 surface opposite the No. 1 surface; providing a second ply having a No. 3 surface and a No. 4 surface opposite the No. 3 surface; the No. 1 surface, No. 2 surface, the No. 3 surface or No. 4 surface having a first section and a second section adjacent the first section; a mask coating layer over the first section wherein the mask coating layer is not present over the second section; and a functional coating layer over at least a portion of the mask coating layer and over the second section; heating the first ply and the second ply either simultaneously or separately and removing the mask coating layer and a portion of the functional coating that is positioned over the mask coating layer to form the automotive transparency.

BRIEF DESCRIPTION OF THE DRAWINGS

FIGS. 1A-3A show cross-sectional views of substrates having a burnable coating mask according to some non-limiting embodiments;

FIGS. 1B-3B show cross-sectional views of segmented substrates prepared using a burnable coating mask according to some non-limiting embodiments;

DESCRIPTION OF THE INVENTION

Figure 1A:
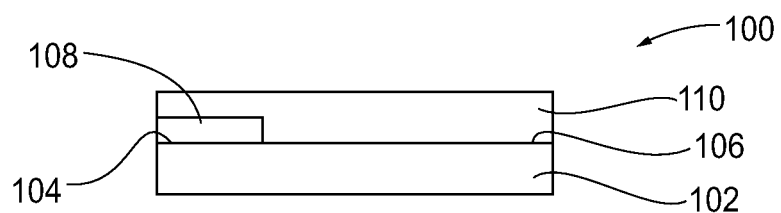
Figure 1B:
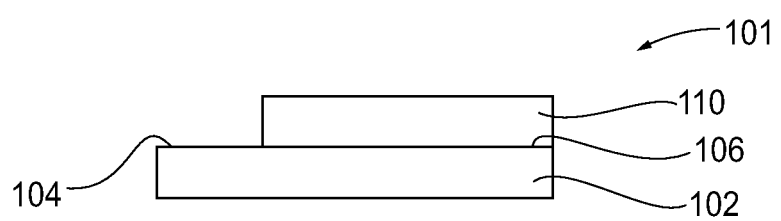

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

For purposes of the following detailed description, it is to be understood that the invention may assume various alternative variations and step sequences, except where expressly specified to the contrary. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

With respect to layers of material described herein, the term "over" means farther from the substrate on which the material is positioned. For example, a second layer positioned "over" a first layer means that the second layer is positioned farther from the substrate than is the first layer. The second layer may be in direct contact with the first layer. Alternatively, one or more other layers may be positioned between the first layer and the second layer.

The terms "polymer" or "polymeric" include oligomers, homopolymers, copolymers, and terpolymers, e.g., polymers formed from two or more types of monomers or polymers.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of this disclosure.

It will be appreciated that components in FIGS. 1A-5 having the same last two digits in their element number correspond to components from the other FIGS. in the application and include the same characteristics of the corresponding components, except where expressly described. For example, components 102, 202, 302, and the like all refer to the substrate described hereinafter since all of these element numbers have the same last two digits (02).

Referring to FIG. 1A, a substrate 100 having a burnable coating mask is shown according to some non-limiting embodiments. The substrate 100 having a burnable coating mask may include a substrate 102 having a first section 104 and a second section 106 on a surface thereof. The substrate 102 may be made of any suitable material. The substrate 102 may be transparent or translucent to visible light. By "transparent" is meant having visible light transmission of greater than 0% up to 100%. By "translucent" is meant allowing electromagnetic energy (e.g., visible light) to pass through but diffusing this energy such that objects on the side opposite the viewer are not clearly visible. Examples of such materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, the substrate 102 can include conventional soda-lime-silicate glass, borosilicate glass, or leaded glass. The glass may be uncoated glass. The glass can be clear glass. By "clear glass" is meant non-tinted or non-colored glass. Alternatively, the glass can be tinted or otherwise colored glass. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The substrate 102 can each be, for example, clear float glass or can be tinted or colored glass. Although not limiting, examples of glass suitable for the substrate 102 are described in U.S. Pat. Nos. 4,746,347; 4,792,536; 5,030,593; 5,030,594; 5,240,886; 5,385,872; and 5,393,593. The substrate 102 can be of any desired dimensions, e.g., length, width, shape, or thickness. In one exemplary substrate used in an automotive transparency, the substrate 102 can be 1 mm to 10 mm thick, such as 1 mm to 8 mm thick, such as 2 mm to 8 mm, such as 3 mm to 7 mm, such as 5 mm to 7 mm, such as 6 mm thick. Non-limiting examples of glass that can be used for the practice of the disclosure includes clear glass, Starphire®, Solargreen®, Solextra®, GL-20®, GL-35™ Solarbronze®, Solargray® glass, Pacifica@ glass, SolarBlue® glass, and Optiblue® glass, all commercially available from PPG Industries Inc. of Pittsburgh, Pennsylvania.

With continued reference to FIG. 1A, the substrate 100 having a burnable coating mask may include a material that may be applied over the first section 104 of the substrate 102 to form a mask coating layer 108, but not over the second section 106 of the substrate. The mask coating layer 108 may be selectively positioned over certain section(s) of the substrate 102 (e.g., the first section 104), while avoiding being positioned over other section(s) of the substrate 102 (e.g., the second section 106). The mask coating layer 108 may be formed directly over the substrate 102 (so as to be in direct contact therewith), or the mask coating layer 108 may be formed indirectly over the substrate 102 (having at least one intervening coating layer between the substrate 102 and the mask coating layer 108). Preferably the masking coating layer 108 is formed directly onto the substrate 100. The mask coating layer 108 may be applied using any suitable application method including, but not limited to, inkjet printing, silk screen printing, stamping, and the like. The method may further include preparing the material via an emulsion, where the material is dispersed in water or an aqueous medium. As used herein, an "aqueous medium" is a liquid mixture comprising greater than 50% water. It is appreciated that greater than 50% water is with respect to the total liquid content, such that any solids present are not taken into consideration. The mask coating layer 108 may have a thickness ranging from 10 nm to 2000 μm, such as 10 nm to 1,000 μm, 10 nm to 500 μm, 0.5 μm to 100 μm, 0.5 μm to 10 μm, 10 μm to 30 μm, or 50 μm to 100 μm.

The mask coating layer 108 may include a material including wax, an organic oil (e.g., tung oil), a polyolefin, a (meth)acrylate (e.g., a poly(meth)acrylate) (as will be understood herein, (meth)acrylate refers to both acrylate and methacrylate), a polyester, an alkene, a polyethylene, a polypropylene, an emulsion thereof, or some combination thereof. The mask coating layer 108 may comprise polylactic acid (PLA), polyethylene carbonate (PEC), polypropylene carbonate (PPC), polycaprolactone, polyoxymethylene, polyethylene, polypropylene, or some combination thereof. The wax may include stearic acid, paraffin, carnauba, microcrystalline wax, polyethylene wax, or some combination thereof. Examples of wax emulsions include those available from Michelman, Inc. (Cincinnati, OH) (e.g., MGRD 1350, ML160, ME62330, Aqua240 PH90602L, ME48040M2) or BYK-Chemie GmbH (Wesel, Germany) (e.g., AQUACER 526, AQUACER 541, AQUACER 1031, AQUACER 8500). The wax emulsion may be a paraffin/polyethylene emulsion, an anionic polyamide emulsion, an anionic carnauba emulsion, an amine dispersed carnauba emulsion, an ethylene acrylic acid emulsion, a non-ionic microcrystalline emulsion, or some combination thereof. In some non-limiting examples, the mask coating layer 108 may include an alkane, an ester, or a carboxylic acid and have at least 40 wt. % carbon, based on the total weight of the mask coating layer 108, such as at least 50 wt. %, at least 60 wt. %, at least 70 wt. %, at least 80 wt. %, or at least 90 wt. %. The material may be mixed with a solvent. For example, the material may include a mixture of PLA and methyl acetate.

Alternatively, or in addition to any of the aforementioned materials of the mask coating layer 108 may include a polyurethane material, an epoxide material, a polyurea material, or a combination thereof. As used herein, a "polyurethane material" is a material that forms at least a portion of the mask coating layer 108 and which comprises urethane linkages and/or is made from components comprising a polyurethane. Examples of polyurethanes that may be used include aqueous polyurethanes, polyurethanes formed from a two component system, emulsions thereof, and combinations thereof. The polyurethanes may comprise additional functional groups including ester linkages, ether linkages, and hydrophilic groups such as hydroxyl groups, carboxyl groups, carbonyl groups, amino groups, thiols, and the like. Hydrophilic functional groups may be incorporated into the polyurethane to aid in the formation of an emulsion. The polyurethanes can be obtained by reacting one or more hydroxyl functional compounds with one or more isocyanate functional compounds. The hydroxyl functional compounds can include diols and/or polyols having 3 or more hydroxyl functional groups. The isocyanate functional compounds can include compounds having 2 or more isocyanate functional groups, such as 3 or more isocyanate functional groups. The isocyanate functional compounds can comprise unblocked isocyanates, blocked isocyanates, partially blocked isocyanates, or a combination thereof.

As indicated, the mask coating layer 108 may include an epoxide material. As used herein, an "epoxide material" is a material that comprises an epoxide or that is obtained from components comprising an epoxide. Examples of epoxides include epoxy functional polymeric materials, which is also known as a polyepoxide and which comprises two or more epoxy functional groups. The epoxides may be an emulsion. The epoxide can comprise one or more additional functional groups (e.g. carboxylic acid and/or hydroxyl functional groups) and be reactive with itself as a self-crosslinkable compound to form the reaction product. Alternatively, the epoxide can be reacted with a second compound such as a carboxylic acid and/or hydroxyl functional compound to form the reaction product. The epoxide may also comprise epoxy functional groups when there are excess epoxy functional groups in the reactants. Alternatively, the epoxy functional groups may all react during the reaction to form the epoxide layer such that no epoxy functional groups are present in the mask coating layer 108.

As indicated, the mask coating layer 108 may include a polyurea material. As used herein, a "polyurea material" is a material that comprises urea linkages and/or is formed from components comprising a polyurea.

The mask coating layer 108 may include both a polyurethane material and an epoxide material. If both a polyurethane material and an epoxide material are present, the polyurethane material and epoxide material may be formed together such that the mask coating layer 108 comprises one layer comprising both a polyurethane and an epoxide. Alternatively, if both a polyurethane material and an epoxide material are present, the polyurethane material and epoxide material may be formed as separate layers. For example, the polyurethane material may be formed over the substrate and the epoxide material may be formed over the polyurethane material as separate layers. As a further example, the epoxide material may be formed over the substrate and the polyurethane material may be formed over the epoxide material as separate layers.

As used herein, the terms "one-component" or "1K" refer to a coating composition wherein all of the coating components are combined and stored in a single container. As used herein, the terms "two-component" or "2K" refer to a coating composition wherein the components are stored separately and, when mixed with one another, react to crosslink to form a crosslinked material.

The material applied to form the mask coating layer 108 may be a thermoplastic or thermoset. As used herein, a "thermoplastic" is a material that softens when heated and has a defined melting point. The material applied to form the mask coating layer 108 may be a thermoset of any of the previously mentioned materials of the mask coating layer 108. As used herein, a "thermoset" is any crosslinked material that does not have a defined melting point, and instead burns or decomposes when heated. The material applied to form the mask coating layer 108 may have a low degree of cross-linking such that the material has a defined melting temperature. The material applied to form the mask coating layer 108 may have a high degree of cross-linking such that the material does not have a defined melting temperature. A high degree of cross-linking can be achieved, for example, via solvent based formulations or by the addition of a crosslinker to an aqueous formulation.

The mask coating layer 108 may include a material that when included in a composition and applied to a substrate and solidified to form a layer, the layer exhibits a water contact angle (WCA) (upon contact with water) of at least 60°, such as at least 70°, or at least 80°. The mask coating layer 108 may include a hydrophobic material. A hydrophobic material is defined herein as a material that when included in a composition and applied to a substrate and solidified to form a layer, the layer exhibits a WCA (upon contact with water) of at least 90°, such as at least 100°, at least 110°, at least 120°, at least 130°, at least 140°, or at least 150°.

The mask coating layer 108 may include a material having a melting point of at least 60° C., such as at least 70° C. or at least 80° C. The mask coating layer 108 may have a melting point of from 60° C.-350° C. The mask coating layer 108 may include a material that, when solidified, is impermeable to water and other standard processing liquids, such as cooling agents, cutting oils, and the like. The mask coating layer 108 may provide increased corrosion protection to the substrate 102 compared to the same substrate not including the mask coating layer 108 positioned thereover.

In some non-limiting examples, the material applied to form the mask coating layer 108 may include an emulsion comprising a hydrophobic material, water, and a surfactant, and the surfactant may be a non-ionic surfactant or an ionic surfactant (e.g., a cationic or an anionic surfactant). The material applied to form the mask coating layer 108 may include a material comprising a hydrophobic material dissolved in a solvent. The material applied to form the mask coating layer may include a UV curable or heat curable material that, when applied to the surface of the substrate and exposed to a UV source or heat source, results in crosslinking of the applied material on the substrate. The material applied to form the mask coating layer may include a two component (2K) resin that includes separate components that, when mixed with one another, react to crosslink the material upon application of the material to the surface of the substrate.

In some non-limiting examples, the material is heated until its temperature is at least the glass transition temperature ("Tg") of the material, and the material is applied at the temperature that is at least the Tg of the material. In other non-limiting examples the material is applied at a temperature below the Tg of the material and subsequently heated to a temperature suitable for the material to soften, such as above the Tg of the material. A non-limiting example includes Carnauba wax, such as ML160, available from Michelman, Inc. (Cincinnati, OH), which may require a heat treatment to a temperature above its Tg of 63° C., such as at least 70° C., at least 80° C., or at least 90° C. The material may also require a curing step at a temperature for a period of time. For example, the material may be cured at room temperature (i.e., in the range of 20-27° C., such as 25° C.) for a period of time of up to 72 hours, or up to 48 hours, or up to 36 hours, or up to 24 hours. The material may also be cured at an elevated temperature, such as in the range of 90-180° C., or 100-170° C., or 110-150° C., or 120-130° C. (such as 121° C.), for a period of time of up to 2 hours, such as 1 hour, such as 30 minutes, such as 15 minutes.

The mask coating layer 108 may comprise optional additional components. Non-limiting examples of additional components include plasticizers, crosslinkers, viscosity modifiers, corrosion inhibitors, infrared (IR) absorbers, adhesion modifiers, UV absorbers, pigments, surfactants, and hydrophobic agents. An example of suitable plasticizers for use in the composition of the mask coating layer 108 include oils such as cotton seed oil, epoxidized soybean oil, and canola oil, waxes such as carnauba wax, paraffin, and microcrystalline wax, polyethylene glycol, and polypropylene glycol. Plasticizers are included in the mask coating layer 108 composition to aid in the removal of the mask coating layer 108 via abrasion wheels, especially when the mask coating layer 108 is a thermoset resin system. A plasticizer may be included in the mask coating layer 108 in an amount in the range of 1 to 50 wt %, or 4 to 40 wt %, or 10 to 30 wt %, based on the total solid components of the mask coating layer 108.

Examples of suitable viscosity modifiers include RHEOBYK-425, RHEOBYK-T 1000VF, RHEOBYK-L 1400 VF, and RHEOBYK-H 3300 VF commercially available from BYK and H1335 and HY124 commercially available from Spectrum. A viscosity modifier may be included in the mask coating layer 108 in an amount in the range of 0.05 to 20 wt %, or 0.1 to 15 wt %, or 0.1 to 10 wt %, based on the total components of the coating mask layer 108.

Examples of suitable hydrophobic agents include waxes, oils, and fatty acids. A hydrophobic agent may be included in the mask coating layer 108 in an amount in the range of 0.5 to 70 wt %, or 1 to 65 wt %, or 1 to 60 wt %, based on the total solid components of the mask coating layer 108.

Examples of suitable crosslinkers for use in the mask coating layer 108 composition include compounds containing an aziridine group. A non-limiting example of a compound that includes an aziridine group that may be used in the mask coating layer 108 is trimethylolpropane tris(2-methyl-1-aziridinepropionate). A crosslinker may be included in the mask coating layer 108 in an amount in the range of 0.05 to 30 wt %, or 0.1 to 20 wt %, or 0.1 to 10 wt %, based on the total solid components of the mask coating layer 108. Crosslinkers are included in the mask coating layer 108 composition in order to crosslink the composition, such as to create a thermoset resin system.

The mask coating layer 108 may comprise inorganic compounds, such as talc, silica, metallic catalysts, inorganic pigments, and the like. Alternatively, one or more of the coating layers (e.g. one or all of the coating layers) may be free of any of the previously described additional components, such as being free of inorganic compounds such as talc, silica, metallic catalysts, inorganic pigments, and the like.

Additional additives, such as crosslinkers, may be added during preparation of the material that forms the mask coating layer 108. Alternatively, the additional additives may be added right before the material is applied to form the mask coating layer 108.

With continued reference to FIG. 1A, substrate 100 having a burnable coating mask may include a functional coating material applied over at least a portion of the mask coating layer 108 and over the second section 106 of the substrate 102 to form a coating layer 110. The coating layer 110 may have a functional coating layer. The coating layer 110 may have a protective layer over the functional coating layer. The functional coating layer may have a thickness of less than 1 μm.

As used herein, the term "functional coating layer" refers to a coating which imparts a functional benefit to the surface beyond decoration of the surface. Non-limiting examples include coatings that impart an optical property, structural property, electrical property, hygienic property, thermal property, and/or physio-chemical property to the surface. Non-limiting examples of functional coatings include at least one of a low-e (low-emissivity) coating, a hydrophilic coating, a hydrophobic coating, an oleophilic coating, a low friction coating, an anti-microbial coating, an anti-fingerprint coating, an anti-fog coating, a self-cleaning coating, an easy-clean coating, a transparent conductive coating, and combinations thereof. The functional coating layer may include a solar control coating. As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity, etc.; the solar control coating can block, absorb, or filter selected portions of the solar spectrum, such as, but not limited to, the IR, UV, and/or visible spectrums.

The functional coating layer may be a single-layer or multi-layer coating. The functional coating layer may be a multi-layer solar control coating, such as is described in US 2017/0341977.

The functional coating layer may include any temperable coating layer, for example, those disclosed in British Patent No. GB 2,302,102; U.S. Pat. Nos. 4,504,109; 4,952,423; 5,028,759; 5,059,295; 5,653,903; 7,749,621; 8,865,325; U.S. Published Patent Application No. 2014/0272453. The functional coating layer may include coatings available under the tradename Solarban® or Sungate®, commercially available from Vitro Architectural Glass (Cheswick, PA).

The functional coating layer may comprise a metallic layer comprising a metallic material, such as gold, copper, aluminum, palladium, or a combination thereof. The functional coating layer may be applied to the substrate using magnetron sputtering vapor deposition ("MSVD"), such as a MSVD coated glass. Non-limiting examples of suitable functional coatings and coated substrates are disclosed in US 2017/0341977; US 2018/0118614; US 2019/0204480; U.S. Pat. Nos. 7,335,421; 8,865,325; 9,932,267; and 10,479,724; all of which are incorporated herein by reference in their entirety.

A protective layer may be applied over the functional coating layer. The protective layer can help protect the underlying coating layers, such as functional coating layer and any of its component films and layers, from mechanical and/or chemical attack. The protective layer may be comprised of $Si_3N_4$, SiAlN, SiAlON, titania, alumina, silica, zirconia, tin oxide, a mixture thereof, and/or an alloy thereof, and which may provide increased durability to the functional coating layer. For example, the protective layer can be SiAlN, $Si_3N_4$, TiAlO or $TiO_2$. The protective layer can have a thickness in the range of 10 Å to 800 Å, such as 100 Å to 800 Å, such as 100 Å to 400 Å, such as 350 Å to 400 Å; or a thickness range of 100 Å to 400 Å, such as 200 Å to 300 Å, such as 270 Å to 330 Å, such as 10 Å to 80 Å, such as 45 Å to 55 Å. The protective layer may be the uppermost layer of the substrate.

Figure 2A:
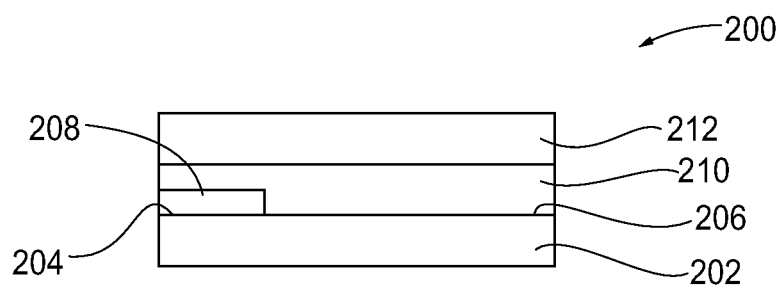
Figure 2B:
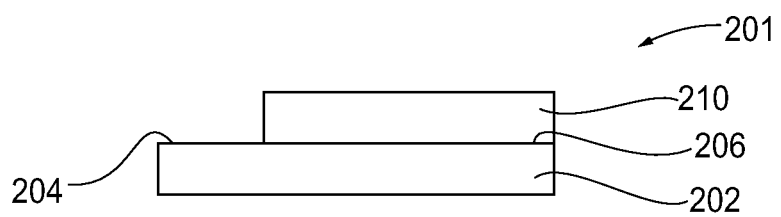

Referring to FIG. 2A, a substrate 200 having a burnable coating mask is shown according to some non-limiting embodiments. The substrate 200 having a burnable coating mask may include a substrate 202 having a first section 204 and a second section 206 on a surface thereof. The substrate 200 having a burnable coating mask may have the same characteristics as the substrate 100 having a burnable coating mask as described in FIG. 1A except as follows. The substrate 200 having a burnable coating mask may further include a temporary protective material applied over at least a portion of the coating layer 210 to form a temporary protective layer 212. The temporary protective layer 212 may be positioned over the entire substrate 202 or selectively positioned over certain sections of the substrate 202. The temporary protective layer 212 may be an outermost layer over the substrate 202.

The material used to form the temporary protective layer 212 may include any of the previously-described materials used to form the mask coating layer 208. The temporary protective layer 212 may be formed from the same or different of those materials compared to the mask coating layer 208.

Figure 3A:
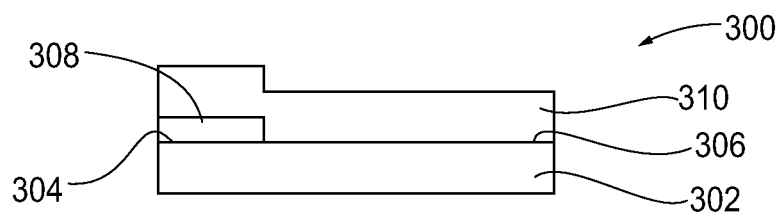
Figure 3B:
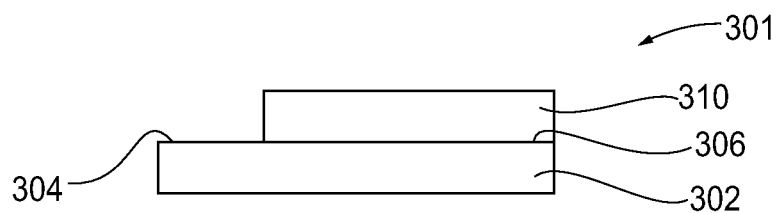

Referring to FIG. 3A, a substrate 300 having a burnable coating mask is shown according to some non-limiting embodiments. The substrate 300 having a burnable coating mask may have the same characteristics as the substrate 100 having a burnable coating mask as described in FIG. 1A except as follows. As shown in FIG. 1A, the coating layer 110 may have a non-uniform thickness, such that the coating layer 110 has a first thickness over the second section 106 and has a second thickness over the first section 104. The first thickness may be thicker than the second thickness. The first thickness and the second thickness may be such that the surface of the coating layer 110 is substantially the same distance from the substrate 102 across the entire coating layer 110. The substrate 300 having a burnable coating mask in FIG. 3A is different than the substrate 100 having a burnable coating mask in FIG. 1A, in that the substrate 300 having a burnable coating mask in FIG. 3A has a coating layer 310 having a substantially uniform thickness (e.g., within 5% of the average thickness across the entire coating layer 310). In this way, the surface of the coating layer 310 may be a different distance from the substrate 302 in certain sections of the coating layer 310. For example, as shown in FIG. 3A, the surface of the coating layer 310 over the first section 304 may be farther from the substrate 302 than the surface of the coating layer 310 over the second section 306 by the thickness of the mask coating layer 308.

Referring to FIGS. 1B-3B, segmented substrates 101, 201, 301 prepared using a burnable coating mask are shown. The segmented substrates 101, 201, 301 from FIGS. 1B-3B correspond to the substrates 100, 200, 300 having a burnable coating mask from FIGS. 1A-3A, respectively, after the substrates 100, 200, 300 having a burnable coating mask have undergone a heat treatment process to form the segmented substrates 101, 201, 301. The heat treatment process may remove the mask coating layer and/or the temporary protective layer. The section of the coating layer positioned over the mask coating layer may be removed during the heat treatment process as a result of the mask coating layer thereunder being removed. Upon the mask coating layer being removed by the heat treatment process, the first section of the substrate may be exposed.

The material used to form the mask coating layer and/or the temporary protective layer may be "burnable" so as to be removable by the heat treatment process. As used in this disclosure, the term "burnable" refers to a material that will burn, evaporate, or otherwise thermally decompose from the substrate, interacting with the substrate or otherwise substantially damaging (as defined hereinafter) the aesthetics or performance of the substrate (including any coating thereover). Burnable materials may burn, evaporate or otherwise thermally decompose at least when the temperature of the substrate is from 500° C. to 1000° C. It is anticipated that the burnable material will burn, evaporate, or otherwise thermally decompose before the substrate reaches a temperature of 1000° C., such as a temperature of 900° C., 800° C., 700° C., or 650° C. from the heat treatment process. The heat treatment process may be conducted in a furnace having a temperature of up to 1200° C., such as up to 1100° C., up to 1000° C., up to 900° C., up to 800° C., up to 700° C., or up to 650° C. The furnace may operate at a temperature of 700° C., such that the substrate reaches a temperature of 640° C. to burn off the mask coating layer and/or the temporary protective layer to be removed during the heat treatment process. In some non-limiting embodiments, the burnable material may be removed during standard heat treatment processes, such as tempering, heat strengthening, or bending or during a heat treatment specifically performed to remove the burnable material without adversely affecting the substrate, as previously described. In some non-limiting examples, the burnable material may be removed during a standard tempering procedure in which the tempering ovens operate in the range of 500° C.-1000° C.

The mask coating layer and/or the temporary protective layer may be configured to be removable by the heat treatment process without substantially damaging the first section of the substrate. As used herein, "substantially damaging" is defined as a change that is detrimental to the function or aesthetics of the first section of the substrate that constitutes any unwanted change in a substrate property that would make the substrate unacceptable for its intended purpose. For example, substantially damaging the surface may include substantial discoloration to the surface from the heat treatment process. In other applications where a heating step is part of the standard procedure, the damage may be defined as an unwanted color change due to the presence of the mask coating layer and/or the temporary protective layer. As used herein, substantial discoloration means a color change (DECMC) of more than 3 units, more than 2 units, or more than 1 unit compared to the color of a similar substrate processed without the mask coating layer and/or the temporary protective layer. DECMC (CIELAB) may be measured using an integrating sphere with D65 Illumination, 10° observer with specular component included according to ASTM Designation: D 2244-05 unless otherwise stated. Other examples of substantial damage include or could be induced by a change in surface roughness, a change in the oxidation state of the surface, or a change in surface energy due to the presence of the mask coating layer and/or the temporary protective layer during the heat treatment process, or an unwanted reaction between the mask coating layer and/or the temporary protective layer and the substrate during the heat treatment process. Substantial damage may include any detrimental change to the functional coating layer (e.g., an anti-microbial functional coating that no longer sanitizes the surface after the heat treatment process, a hydrophobic functional coating that loses its hydrophobicity after the heat treatment process, a color change to the functional coating discernable by the human eye (e.g., DECMC>3, 2, or 1) compared to a substrate heated without the mask coating layer and/or the temporary protective layer.

Figure 4:
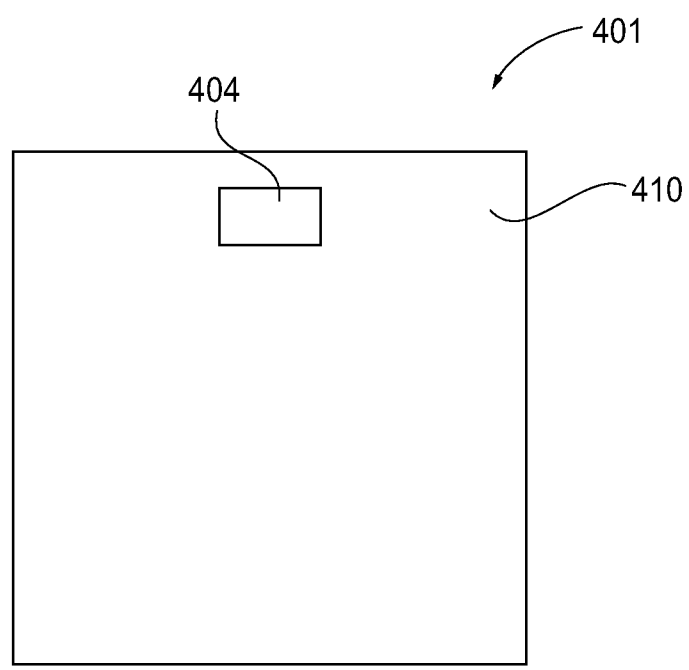
FIG. 4 shows a plan view of a segmented substrate according to some non-limiting embodiments.

Referring to FIG. 4, a plan view of a segmented substrate 401 is shown according to some non-limiting embodiments. The segmented substrate 401 may include the first section 404 of the substrate exposed with the coating layer 410 positioned over the second section of the substrate 410, but not over the first section 404 of the substrate. The coating layer 410 may be exposed as an outermost layer of the segmented substrate 401. The segmented substrate may be prepared by providing any of the previously-described substrates having a burnable coating mask and applying a heat treatment to the substrate having the burnable coating mask such that the mask coating layer is removed from the first section 404 and thereby any coating that is applied over the mask coating layer is also removed. The heat treatment may also remove any of the previously-described temporary protective layers.

A method of segmenting a substrate having at least one layer thereover may include providing any of the previously-described substrates having a burnable coating mask and heating the substrate having the burnable coating mask such that the mask coating layer and the portion of the functional coating over the mask coating layer are removed from the first section. The heating step may also remove any of the previously-described temporary protective layers. The heating step may including any of the previously-described heat treatment processes.

A method of preparing a segmented substrate having at least one layer thereover may include providing a substrate having a first surface and a second surface opposite the first surface. The first surface has a first section and a second section adjacent the first section. A first material may be applied over the first section to form the mask coating layer. The mask coating layer is not applied over the second section. A functional material may be applied over at least a portion of the mask coating layer and over the second section of the first surface to form the functional coating layer of the coating layer. The substrate comprising the mask coating layer may be washed and/or shipped to a desired destination before application of the functional coating. A second material may be applied over at least a portion of the coating layer to form a temporary protective layer. The first material and the second material may be the same materials, or they may be different from one another.

Figure 5A:
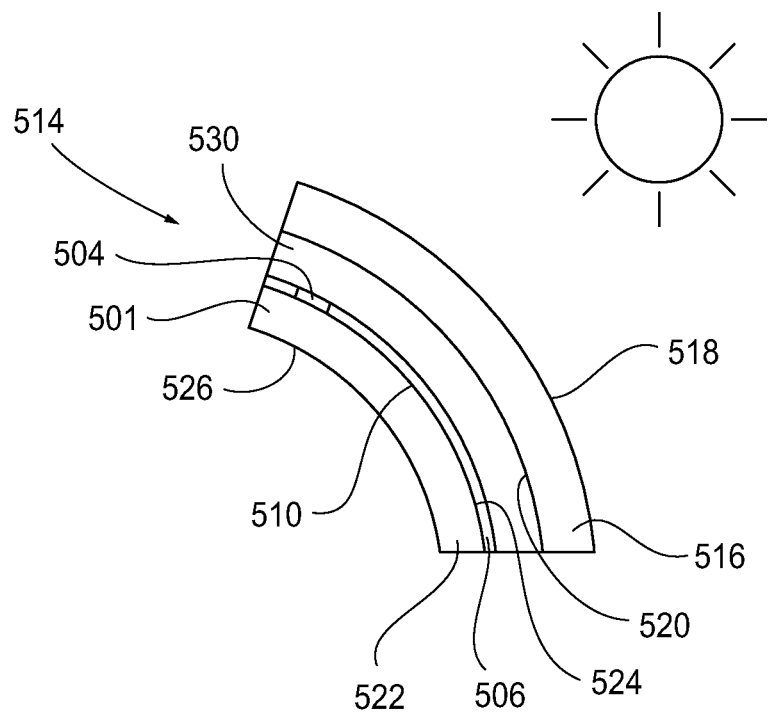
FIG. 5 shows a cross-sectional view of a transparency according to some non-limiting embodiments.
Figure 5B:
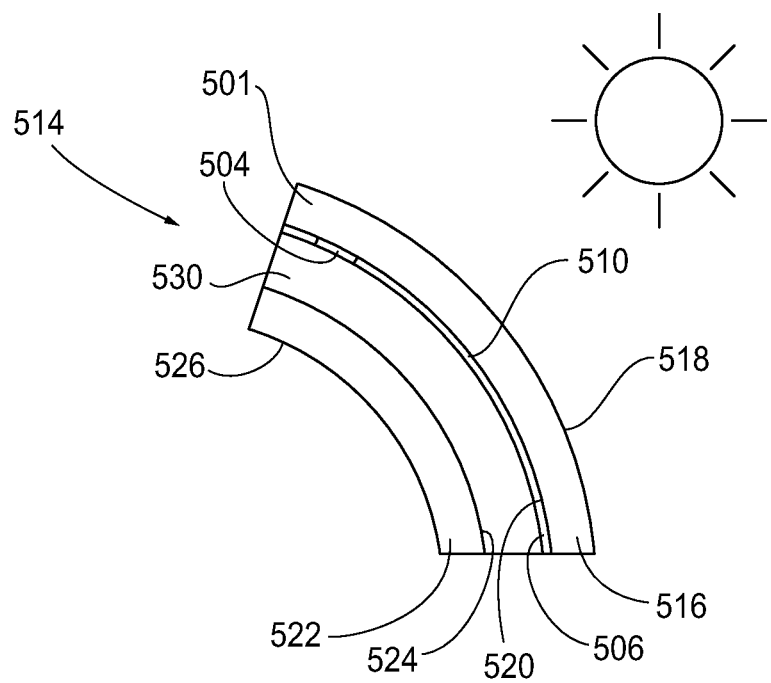

Referring to FIGS. 5A-5B, a transparency 514 (e.g., an automotive transparency) is shown according to some non-limiting embodiments. The transparency 514 may include a first ply 516 with a first major surface 518 (No. 1 surface) and an opposed second major surface 520 (No. 2 surface). In the illustrated non-limiting embodiments, the first major surface 518 faces outside (e.g., the sun), i.e., is an outer major surface, and the second major surface 520 faces inside. The transparency 514 may also include a second ply 522 having an outer (closer to the outside) first major surface 524 (No. 3 surface) and an inner (second) major surface (No. 4 surface). This numbering of ply surfaces is in keeping with conventional practice in the automotive art. The first ply 516 and the second ply 522 can be bonded together in any suitable manner, and may include a conventional interlayer 530 between the first ply 516 and the second ply 522. As shown in FIGS. 5A-5B, the first ply 516 or the second ply 522 may be the segmented substrate 501 prepared from a substrate having a burnable coating mask. The coating layer 510 may be formed over at least a portion of one of the plies 516, 522 (e.g., the second section 506 thereof), such as, but not limited to, over at least a portion of the No. 3 surface 526 (FIG. 5A) or at least a portion of the No. 2 surface 520 (FIG. 5B). The functional coating 510 could also be on the No. 1 surface or the No. 4 surface, if desired. After the heating and bending step described herein, the burnable coating mask is burned away from the ply 516, 522 causing the first section of the ply 516, 522 to be void of any coating while the second section retains the coating 510.

The transparency 514 may be prepared by providing a substrate having a burnable coating mask (as the first ply 516 and/or the second ply 522) and applying a heat treatment to the substrate such that the mask coating layer is removed from the first section 504. The substrate having a burnable coating mask may include the temporary protective layer, which may be removed by the heat treatment.

The transparency 514 may be a transparency in any desired field, such as but not limited to, transparencies for land, air, space, above water and underwater vehicles. Additionally, while a typical "transparency" can have sufficient visible light transmission such that materials can be viewed through the transparency, in the practice of the invention, the "transparency" need not be transparent to visible light but may be translucent or opaque.

In some non-limiting examples, the transparency 514 may be a windshield of a vehicle. The vehicle may utilize autonomous vehicle technology, such as a detector and/or a sensors (hereinafter referred to collectively as a "sensor") (e.g., infrared cameras, LIDAR, rain detectors, and the like). The sensors may be positioned inside of the vehicle, and the radiation or other sensing mechanism emitted by the sensor may travel through the transparency 514 to the outside of the vehicle to sense the surroundings. As the functional coating layer of the coating layer 510 of the transparency 514 may obstruct the radiation emitted by the sensor, the sensor may be positioned such that the radiation emitted therefrom travels through the first section 504 of the segmented substrate 501. The first section 504 of the segmented substrate 501 may be uncoated or have a coating thereover which does not affect the sensing capabilities of the sensor. Therefore, the first section 504 may be selectively positioned on the segmented substrate 501 based on the position of the sensors in the vehicle. This means that the segmented substrate 501 may be prepared from a substrate having a burnable coating mask over the first section 504, such that the segmented substrate 501 is compatible with the position of the sensor in the vehicle (will not adversely affect the sensor) after the heat treatment process to remove the burnable coating mask.

In some non-limiting embodiments, method of preparing an automotive transparency may include providing a first ply having an outer first major surface and an opposing inner second major surface and providing a second ply having a burnable coating mask as previously described. Alternatively, the first ply may have the burnable coating mask as previously described. The second ply has an inner third major surface and an opposing outer fourth major surface, the third major surface having a first section and a second section adjacent the first section. The mask coating layer may be over the first section. The functional coating layer may be over at least a portion of the mask coating layer and over the second section.

The method may include heating the first ply and the second ply to a temperature sufficient to bend the first ply and the second ply. Heating the first ply or the second ply may include heating the first ply or the second ply to a temperature such that the mask coating layer is removed from the first section. The temperature may be at most 1000° C.

Bending the first ply and the second ply may include bending the first ply and the second ply together. Bending the first ply and the second ply may include bending the first ply and the second ply separately. Bending the plies may occur during heating. The bent first ply and bent second ply may be joined to one another to form an automotive transparency in any way that two plies are typically joined to form automotive transparencies.

An interlayer may be positioned between the first ply and the second ply, or the first bent ply and the second bent ply prior to adhering the first bent ply and the second bent ply, or after the first ply is heated and bent, or after the second ply is heated and bent, or after the first ply and the second ply is heated and bent. The interlayer can be of any desired material and can include one or more layers or plies. The interlayer can be a polymeric or plastic material, such as, for example, polyvinylbutyral, plasticized polyvinyl chloride, or multi-layered thermoplastic materials including polyethyleneterephthalate, and the like. Suitable interlayer materials are disclosed, for example, in U.S. Pat. Nos. 4,287,107 and 3,762,988. The interlayer may secure the first and second plies together, and can provide energy absorption, reduce noise, and increase the strength of the laminated structure. Alternatively, the first and second plies can be joined together through other means. The interlayer can also be a sound-absorbing or attenuating material as described, for example, in U.S. Pat. No. 5,796,055. The interlayer can have a functional coating layer provided thereon or incorporated therein or can include a colored material to reduce solar energy transmission and/or to provide a color to the transparency. In one non-limiting embodiment, the interlayer may be polyvinylbutyral and have a thickness in the range of 0.5 mm to 1.5 mm, such as 0.75 mm to 0.8 mm (See FIG. 5).

The present invention further includes the subject matter of the following clauses.

Clause 1: A substrate having a burnable coating mask, comprising: a substrate having a first surface and a second surface opposite the first surface; the first surfacing having a first section and a second section adjacent the first section; a mask coating layer over the first section, wherein the mask coating layer is not positioned over the second section; and a functional coating layer over at least a portion of the mask coating layer and over the second section.

Clause 2: The substrate of clause 1, further comprising: a temporary protective layer over at least a portion of the functional coating layer.

Clause 3: The substrate of clause 1 or 2, wherein the substrate comprises a glass sheet.

Clause 4: The substrate of any of clauses 1-3, wherein the mask coating layer is in direct contact with the substrate.

Clause 5: The substrate of any of clauses 1-4, wherein the mask coating layer comprises at least one of a wax, an organic oil, a (meth)acrylate, a polyolefin, a polyester, a polycarbonate, a polyether, a polyurethane material, an epoxide material, a polyurea material, or some combination thereof.

Clause 6: The substrate of clause 5, wherein the mask coating layer comprises at least one of polylactic acid (PLA), polyethylene carbonate (PEC), polypropylene carbonate (PPC), polycaprolactone, polyoxymethylene, polyethylene, polypropylene, an aqueous polyurethane, a polyurethane formed from a two component system, an epoxy functional polymeric material, or some combination thereof.

Clause 7: The substrate of any of clauses 2-6, wherein the temporary protective layer comprises at least one of a wax, an organic oil, a (meth)acrylate, a polyolefin, a polyester, a polycarbonate, a polyether, or some combination thereof.

Clause 8: The substrate of any of clauses 1-7, wherein the mask coating layer further comprises additional components including plasticizers, crosslinkers, viscosity modifiers, corrosion inhibitors, infrared (IR) absorbers, adhesion modifiers, UV absorbers, pigments, surfactants, hydrophobic agents, or a combination thereof.

Clause 9: The substrate of any of clauses 1-8, wherein the mask coating layer is removable by burning at a temperature of at most 1000° C.

Clause 10: The substrate of any of clauses 1-9, wherein the mask coating layer is configured to be removable by a heat treatment process without substantial damage to the first section.

Clause 11: The substrate of any of the clauses 1-10 further comprising a protective layer positioned over at least a portion of the functional coating layer.

Clause 12: The substrate of clause 11 wherein the protective layer is selected from the group consisting of a metal oxide or a metal nitride.

Clause 13: A method of segmenting a substrate having a layer thereover, comprising: providing a substrate having a burnable coating mask, comprising: a substrate having a first surface and a second surface opposite the first surface; the first surface having a first section and a second section adjacent the first section; a mask coating layer over the first section, wherein the mask coating layer is not positioned over the second section; and a functional coating layer over at least a portion of the mask coating layer and over the second section; and heating the substrate having the burnable coating mask such that the mask coating layer and a portion of the functional coating layer positioned over the mask coating layer are removed from the first section.

Clause 14: The method of clause 13, wherein the substrate having the burnable coating mask further comprises a temporary protective layer over at least a portion of the functional coating layer, wherein the heat treatment removes the temporary protective layer from the functional coating layer.

Clause 15: The method of clause 13 or 14, wherein the substrate comprises a glass sheet.

Clause 16: The method of any of clauses 13-15, wherein the mask coating layer is in direct contact with the substrate.

Clause 17: The method of any of clauses 13-16, wherein the mask coating layer comprises at least one of a wax, an organic oil, a (meth)acrylate, a polyolefin, a polyester, a polycarbonate, a polyether, a polyurethane material, an epoxide material, a polyurea material, or some combination thereof.

Clause 18: The method of clause 17, wherein the mask coating layer comprises at least one of polylactic acid (PLA), polyethylene carbonate (PEC), polypropylene carbonate (PPC), polycaprolactone, polyoxymethylene, polyethylene, polypropylene, an aqueous polyurethane, a polyurethane formed from a two component system, an epoxy functional polymeric material, or some combination thereof.

Clause 19: The method of any of clauses 14-18, wherein the temporary protective layer comprises at least one of a wax, an organic oil, a (meth)acrylate, a polyolefin, a polyester, a polycarbonate, a polyether, or some combination thereof.

Clause 20: The method of any of clauses 13-19, wherein the mask coating layer further comprises additional components including plasticizers, crosslinkers, viscosity modifiers, corrosion inhibitors, infrared (IR) absorbers, adhesion modifiers, UV absorbers, pigments, surfactants, hydrophobic agents, or a combination thereof.

Clause 21: The method of any of clauses 13-20, wherein the heating step comprises heating the substrate having the burnable coating mask at a temperature of at most 1000° C.

Clause 22: The method of any of the clauses 13-21 further comprising a protective layer positioned over at least a portion of the functional coating layer.

Clause 23: The method of clause 22 wherein the protective layer is selected from the group consisting of a metal oxide or a metal nitride.

Clause 24: The method of any of clauses 13-23, wherein the mask coating layer is configured to be removable by the heat treatment without substantial damage to the first section.

Clause 25: A method of preparing a segmented substrate having a layer thereover, comprising: providing a substrate having a first surface and a second surface opposite the first surface; the first surface having a first section and a second section adjacent the first section; applying a material over the first section to form a mask coating layer, wherein the mask coating layer is not applied over the second section; and applying a functional material over at least a portion of the mask coating layer and over the second section to form a functional coating layer.

Clause 26: The method of clause 25, further comprising: applying a second material over at least a portion of the functional coating layer to form a temporary protective layer.

Clause 27: The method of clause 25 or 26, wherein the substrate comprises a glass sheet.

Clause 28: The method of any of clauses 25-27, wherein the mask coating layer is in direct contact with the substrate.

Clause 29: The method of any of clauses 25-28, wherein the mask coating layer comprises at least one of a wax, an organic oil, a (meth)acrylate, a polyolefin, a polyester, a polycarbonate, a polyether, a polyurethane material, an epoxide material, a polyurea material, or some combination thereof.

Clause 30: The method of clause 29, wherein the mask coating layer comprises at least one of polylactic acid (PLA), polyethylene carbonate (PEC), polypropylene carbonate (PPC), polycaprolactone, polyoxymethylene, polyethylene, polypropylene, an aqueous polyurethane, a polyurethane formed from a two component system, an epoxy functional polymeric material, or some combination thereof.

Clause 31: The method of any of clauses 26-30, wherein the temporary protective layer comprises at least one of a wax, an organic oil, a (meth)acrylate, a polyolefin, a polyester, a polycarbonate, a polyether, or some combination thereof.

Clause 32: The method of any of clauses 25-31, wherein the mask coating layer further comprises additional components including plasticizers, crosslinkers, viscosity modifiers, corrosion inhibitors, infrared (IR) absorbers, adhesion modifiers, UV absorbers, pigments, surfactants, hydrophobic agents, or a combination thereof.

Clause 33: The method of any of clauses 25-32, further comprising: applying a heat treatment to the substrate having the burnable coating mask at a temperature of at most 1000° C.

Clause 34: The method of any of clauses 25-33, wherein the mask coating layer is configured to be removable by a heat treatment without substantial damage to the first section.

Clause 35: The method of any of clauses 25-34 further comprising a protective layer positioned over at least a portion of the functional coating layer.

Clause 36: The method of clause 35 wherein the protective layer is selected from the group consisting of silicon nitride, $Si_3N_4$, SiAlN, SiAlON, titania, alumina, silica, zirconia, tin oxide, a mixture thereof, and an alloy thereof.

Clause 37: The method of any of the clauses 25-36 wherein the second material is different than the material.

Clause 38: The method of any of the clauses 25-36 wherein the second material is the same as the material.

Clause 39: A segmented substrate prepared by: providing a substrate having a burnable coating mask, comprising: a substrate having first surface and a second surface opposite the first surface; the first surface having a first section and a second section adjacent the first section; a mask coating layer over the first section, wherein the mask coating layer is not positioned over the second section; and a functional coating layer over at least a portion of the mask coating layer and over the second section; heating the substrate having the burnable coating mask such that the mask coating layer and a portion of the functional coating that is positioned over the mask coating layer are removed from the first section.

Clause 40: The segmented substrate of clause 41, wherein the substrate having the burnable coating mask further comprises a temporary protective layer over at least a portion of the functional coating layer, wherein the heat treatment removes the temporary protective layer.

Clause 41: The segmented substrate of clause 39 or 40, wherein the substrate comprises a glass sheet.

Clause 42: The segmented substrate of any of clauses 39-41, wherein the mask coating layer is in direct contact with the substrate.

Clause 43: The segmented substrate of any of clauses 39-42, wherein the mask coating layer comprises at least one of a wax, an organic oil, a (meth)acrylate, a polyolefin, a polyester, a polycarbonate, a polyether, a polyurethane material, an epoxide material, a polyurea material, or some combination thereof.

Clause 44: The segmented substrate of clause 43, wherein the mask coating layer comprises at least one of polylactic acid (PLA), polyethylene carbonate (PEC), polypropylene carbonate (PPC), polycaprolactone, polyoxymethylene, polyethylene, polypropylene, an aqueous polyurethane, a polyurethane formed from a two component system, an epoxy functional polymeric material, or some combination thereof.

Clause 45: The segmented substrate of any of clauses 40-44, wherein the temporary protective layer comprises at least one of a wax, an organic oil, a (meth)acrylate, a polyolefin, a polyester, a polycarbonate, a polyether, or some combination thereof.

Clause 46: The segmented substrate of any of clauses 39-45, wherein the mask coating layer further comprises additional components including plasticizers, crosslinkers, viscosity modifiers, corrosion inhibitors, infrared (IR) absorbers, adhesion modifiers, UV absorbers, pigments, surfactants, hydrophobic agents, or a combination thereof.

Clause 47: The segmented substrate of any of clauses 39-46, wherein the heat treatment comprises heating the substrate having the burnable coating mask at a temperature of at most 1000° C.

Clause 48: The segmented substrate of any of clauses 39-47, wherein the mask coating layer is configured to be removable by the heat treatment without substantial damage to the first section.

Clause 49: The segmented substrate of any of the clauses 39-48 further comprising a protective layer positioned over at least a portion of the functional coating layer.

Clause 50: The method of clause 49 wherein the protective layer is selected from the group consisting of silicon nitride, $Si_3N_4$, SiAlN, SiAlON, titania, alumina, silica, zirconia, tin oxide, a mixture thereof, and an alloy thereof.

Clause 51: A method of preparing an automotive transparency, comprising: providing a first ply having a No. 1 surface and a No. 2 surface opposite the No. 1 surface; providing a second ply having a No. 3 surface and a No. 4 surface opposite the No. 3 surface; applying a burnable coating mask to a first section of the No. 1 surface, No. 2, surface, No. 3 surface or No. 4 surface, wherein the burnable coating mask is not applied to a second section of the No. 1 surface, No. 2, surface, No. 3 surface or No. 4 surface; and applying a functional coating layer over at least a portion of the mask coating layer and over the second section; heating the first ply and the second ply either simultaneously or separately; and joining the first ply and the second ply to one another to form the automotive transparency.

Clause 52: The method of clause 51, further comprising: bending the first ply and bending the second ply either simultaneously or separately.

Clause 53: The method of clause 51 or 52, wherein the first ply and the second ply are heated separately.

Clause 54: The method of clause 52 or 53, wherein the first ply and the second player are bent separately.

Clause 55: The method of any of the clauses clause 51-54, further comprising: positioning an interlayer between the first ply and the second ply.

Clause 56: The method of any of clauses 51-55, wherein heating the second ply comprises heating the second ply to a temperature such that the mask coating layer and a portion of the functional coating positioned over the mask coating layer are removed from the first section.

Clause 57: The method of clause 56, wherein the temperature is at most 1000° C.

Clause 58: A method of preparing an automotive transparency, comprising: providing a ply having a first major surface and a second major surface opposite the first major surface, wherein the first major surface comprises a first section and a second section adjacent the first section, wherein a mask coating layer is positioned over the first section, wherein the mask coating layer is not positioned over the second section; and wherein a functional coating layer is positioned over a portion of the mask coating layer and over the second section; heating the ply whereby the mask coating layer and a portion of the functional coating layer positioned over the mask coating layer are removed from the first section; and bending the ply.

Clause 59: The method of clause 58, wherein the temperature is at most 1000° C.

The following example is presented to demonstrate the general principles of the invention of this disclosure. The invention should not be considered as limiting to the specific example presented.

EXAMPLE

Figure 6:
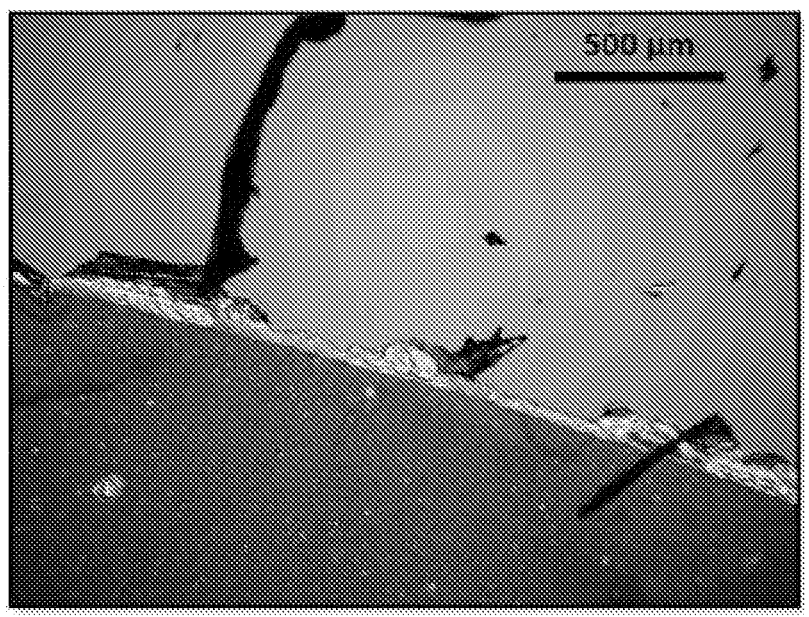
FIG. 6 shows a micrograph of a coated substrate comprising a mask coating layer after heating.

A coated substrate comprising a mask coating layer was prepared according to the following procedure. A 12"×12" and 6 mm thick clear glass substrate was provided. The glass substrate was washed in an industry washer. An epoxy acrylate UV curable resin was diluted with acetone until a 50:50 ratio of components was achieved. A small area of the diluted epoxy acrylate UV curable resin was added to the surface of the glass substrate using an eyedropper. The small area of diluted epoxy acrylate UV curable resin was left to dry and then was subsequently cured using ultraviolet light with an energy density of 250-300 mJ/cm$^2$ to produce a mask coating layer. The thickness of the mask coating layer was in the range of 7-10 μm. The glass substrate with mask coating layer was then washed again in an industry washer. After washing, the glass substrate with mask coating layer was placed in a pilot coater and a Solarban® 60VT double silver functional coating was deposited over the glass substrate and the mask coating layer to produce a coated substrate. The coated substrate was then placed in a box furnace set to a temperature of 700° C. (1292° F.). The coated substrate was heated in the box furnace until a glass temperature of about 1,180° F. (approximately 640° C.) was reached. The coated substrate was then removed from the box furnace and left to cool to room temperature (i.e., between 20-30° C.). FIG. 6 is a micrograph of the coated substrate taken after the coated substrate was removed from the box furnace and allowed to cool to room temperature. As shown in FIG. 6, the area that included the mask coating layer under the functional coating (i.e., bottom and left regions) was removed during heating in the box furnace. Outside of the area including the mask coating layer (i.e., top and right regions), the functional coating remained intact. At the boundary between the area of the coated substrate that included the mask coating layer and the area that did not include the mask coating layer, a small amount of debris can been seen. The coated substrate was washed in an industry washer to remove the remaining debris of the mask coating layer and/or functional coating that remained after heating. Thus, this Example effectively demonstrates the ability of the present invention to produce a coated substrate comprising a functional coating over a first region of the substrate and no functional coating over a second region of the substrate.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A segmented substrate prepared by a process comprising the steps of:
providing a substrate having a burnable coating mask, the substrate comprising:
a substrate having a first surface and a second surface opposite the first surface, the first surface having a first section and a second section adjacent the first section;
a mask coating layer over the first section, wherein the mask coating layer is not positioned over the second section; and
a functional coating layer over at least a portion of the mask coating layer and over the second section; and
heating the substrate having the burnable coating mask such that the mask coating layer and a portion of the functional coating that is positioned over the mask coating layer are removed from the first section,
wherein the mask coating layer comprises at least one of a wax, an organic oil, a polyolefin, a polyester, a polycarbonate, a polyether, an aqueous polyurethane, a polyurethane formed from a two component system, a polyurea material, or some combination thereof.

2. The segmented substrate of claim 1, wherein the substrate having the burnable coating mask further comprises a temporary protective layer over at least a portion of the functional coating layer, and wherein the heat treatment removes the temporary protective layer.

3. The segmented substrate of claim 2, wherein the temporary protective layer comprises at least one of a wax, an organic oil, a (meth)acrylate, a polyolefin, a polyester, a polycarbonate, a polyether, or some combination thereof.

4. The segmented substrate of claim 1, wherein the substrate comprises a glass sheet.

5. The segmented substrate of claim 1, wherein the mask coating layer is in direct contact with the substrate.

6. The segmented substrate of claim 1, wherein the mask coating layer comprises at least one of polylactic acid (PLA), polyethylene carbonate (PEC), polypropylene carbonate (PPC), polycaprolactone, polyoxymethylene, polyethylene, polypropylene, or some combination thereof.

7. The segmented substrate of claim 1, wherein the mask coating layer further comprises additional components including plasticizers, crosslinkers, viscosity modifiers, corrosion inhibitors, infrared (IR) absorbers, adhesion modifiers, UV absorbers, pigments, surfactants, hydrophobic agents, or a combination thereof.

8. The segmented substrate of claim 1, wherein the heat treatment comprises heating the substrate having the burnable coating mask at a temperature of at most 1000° C.

9. The segmented substrate of claim 1, wherein the mask coating layer is configured to be removable by the heat treatment without substantial damage to the first section.

10. The segmented substrate of claim 1, further comprising a protective layer positioned over at least a portion of the functional coating layer.

11. The segmented substrate of claim 10, wherein the protective layer is selected from the group consisting of silicon nitride, $Si_3N_4$, SiAlN, SiAlON, titania, alumina, silica, zirconia, tin oxide, a mixture thereof, and an alloy thereof.

12. A transparency comprising:
a first ply having a number one surface and a number two surface opposite the number one surface;
a second ply having a number three surface and a number four surface opposite the number three surface; and
at least one interlayer located between the number two surface and the number three surface, the interlayer designed to bond the first ply to the second ply,
wherein at least one of the first ply or the second ply is a segmented substrate formed from a substrate having a burnable coating mask comprising:
a substrate having a first surface and a second surface opposite the first surface, wherein the first surface of the substrate comprises a first section and a second section adjacent the first section;
a burnable mask coating layer over the first section, wherein the burnable mask coating layer is not present over the second section; and
a functional coating layer over at least a portion of the mask coating layer and over the second section,
wherein the burnable mask coating layer is removed via a heat treatment such that the mask coating layer is removed from the first section, a first portion of the functional coating positioned over at least the portion of the mask coating layer is removed, and a second portion of the functional coating layer that is positioned over the second section remains on the substrate to yield the segmented substrate that forms one of at least the first ply or the second ply, and
wherein the mask coating layer comprises at least one of a wax, an organic oil, a polyolefin, a polyester, a polycarbonate, a polyether, an aqueous polyurethane, a polyurethane formed from a two component system, a polyurea material, or some combination thereof.

13. The transparency of claim 12, wherein the mask coating layer comprises at least one of polylactic acid (PLA), polyethylene carbonate (PEC), polypropylene carbonate (PPC), polycaprolactone, polyoxymethylene, polyethylene, polypropylene, or some combination thereof.

14. The transparency of claim 12, wherein the mask coating layer is removable by burning at a temperature of at most 1000° C.

* * * * *